United States Patent
Nojima

(10) Patent No.: US 7,210,547 B2
(45) Date of Patent: May 1, 2007

(54) STRADDLE-TYPE VEHICLE

(75) Inventor: Tetsuo Nojima, Hamamatsu (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 151 days.

(21) Appl. No.: 11/072,302

(22) Filed: Mar. 7, 2005

(65) Prior Publication Data

US 2005/0205325 A1  Sep. 22, 2005

(30) Foreign Application Priority Data

Mar. 8, 2004  (JP) ............................ P2004-064479

(51) Int. Cl.
*B60K 13/02* (2006.01)
(52) U.S. Cl. .................. 180/68.3; 123/41.56
(58) Field of Classification Search ............... 180/68.1, 180/68.3; 123/41.56, 41.58
See application file for complete search history.

(56) References Cited

U.S. PATENT DOCUMENTS

| | | | |
|---|---|---|---|
| 5,117,932 A * | 6/1992 | Kurosu et al. ............. | 180/68.2 |
| 5,174,258 A * | 12/1992 | Tanaka ................... | 123/198 E |
| 6,216,809 B1* | 4/2001 | Etou et al. ................. | 180/68.3 |
| 6,382,196 B2* | 5/2002 | Kawamoto et al. ......... | 123/580 |
| 6,564,663 B2* | 5/2003 | Rioux et al. ............. | 74/336 R |
| 6,564,768 B2* | 5/2003 | Bauer et al. ............ | 123/198 E |
| 6,880,659 B2* | 4/2005 | Yamamoto ................... | 180/190 |
| 6,959,934 B2* | 11/2005 | Rioux et al. ............... | 180/68.3 |
| 2002/0096377 A1* | 7/2002 | Kuji et al. | |
| 2004/0129467 A1* | 7/2004 | Tsuruta et al. | |

* cited by examiner

*Primary Examiner*—Christopher Bottorff
(74) *Attorney, Agent, or Firm*—Oblon, Spivak, McClelland, Maier & Neustadt, P.C.

(57) ABSTRACT

A straddle-type vehicle is provided with an engine unit and an engine air-intake system. The engine unit includes a cylinder head provided with an air-intake port communicating with a combustion chamber, the air-intake port being provided with a valve seat disposed to an opening of the combustion chamber. The engine air-intake system includes a throttle body connected to an upstream side of the air-intake port and an air cleaner connected to an upstream side of the throttle body via an air-intake pipe so as that the air cleaner projects upward over the upper frames, the air cleaner having an inner clean section, and an axis connecting the clean section and the throttle body extends linearly toward the valve seat.

12 Claims, 6 Drawing Sheets

STRADDLE-TYPE VEHICLE

BACKGROUND OF THE INVENTION

1. Field of the Invention

The present invention relates to a straddle-type vehicle, and more specifically, it relates to an engine air-intake system for a straddle-type vehicle.

2. Description of the Related Art

In the engine air-intake system mounted in conventional straddle-type vehicles, a carburetor is disposed behind a cylinder head constituting a cylinder assembly of an engine arranged substantially upright, an air cleaner is disposed behind the carburetor, and an exhaust pipe constituting an engine exhaust system is disposed beside the engine air-intake system (see, for example, Japanese Unexamined Patent Laid-open Publication Nos. HEI 11-11171 and 2002-274468).

Since the exhaust pipe is located, as a heat source, in the vicinity of the carburetor and the air cleaner, temperature of outside air to be led into the engine increases. In addition, since the carburetor and the air cleaner are located behind the cylinder head, it is difficult to cool them by the wind while the vehicle is moving. The increase in the temperature of the air will reduce the air-intake efficiency, resulting in reduction of the engine power. Moreover, since the air-intake path from the air cleaner to the air-intake port in the cylinder head has a long length and is bent steeply just before the air-intake port, the air-intake resistance will be increased. The increase in the air-intake resistance may deteriorate the throttle response and the air-intake efficiency.

Furthermore, in the arrangement of the substantially upright cylinder assembly, the center of mass of the vehicle will take a high position, which will deteriorate the steering performance of the vehicle.

SUMMARY OF THE INVENTION

The present invention was conceived in consideration of the matters encountered in the prior art mentioned above, and an object of the present invention to provide a straddle-type vehicle provided with an improved engine air-intake system achieving a high engine performance and efficiency.

This and other objects can be achieved according to the present invention by providing, in one aspect, a straddle-type vehicle comprising:

a body frame including a pair of upper frames disposed substantially horizontally;

a pair of front wheels;

a pair of rear wheels;

an engine unit mounted at a portion between the front wheels and the rear wheels, below the upper frames and below upper portions of the wheels, the engine unit including a cylinder head provided with an air-intake port communicating with a combustion chamber, the air-intake port being provided with a valve seat disposed to an opening of the combustion chamber; and an engine air-intake system including a throttle body connected to an upstream side of the air-intake port and an air cleaner connected to an upstream side of the throttle body via an air-intake pipe, the air cleaner having an inner clean section, so that the air cleaner projects upward over the upper frames and an axis connecting the clean section and the throttle body extends linearly toward the valve seat.

In this aspect, it may be desired that the air cleaner is provided with a volume chamber at an inner rear portion of the air cleaner and an element chamber at an inner front portion thereof in which a cleaner element for filtering air is arranged, an inlet pipe is provided in the volume chamber of the air cleaner and adapted to take air into the volume chamber, the inlet pipe has an inlet opening disposed in a rear upper surface of the air cleaner so as to face backward, the volume chamber is provided with a vertical wall extending upward from a front end of a bottom portion of the volume chamber, and element chamber has a bottom portion which extends forward from an upper end of the vertical wall to be in parallel with the bottom portion of the volume chamber.

The straddle-type vehicle may further comprise a steering gear including a steering shaft and a supporting member supporting the steering shaft rotatably so as to extend upward from the upper frames, wherein the front portion of the air cleaner is fixed to the supporting member and the rear portion thereof is fixed to the body frame so that the air cleaner is tilted backward.

It is desirable that a drain hole is formed to a rear side of the bottom of the volume chamber.

The engine air-intake system may further include a breather chamber provided around the air-intake pipe, and the clean section, the breather chamber and the throttle body of the engine air-intake system are arranged in an overlapped fashion in the described order from an upper portion thereof in an installed state of the engine.

Another volume chamber may be provided under the bottom portion of the element chamber so as to be communicated with the clean section through an opening formed to the bottom portion of the other volume chamber, a funnel portion, which is widened in a diameter direction thereof at an upstream side end of the intake pipe extending in the clean section of the air cleaner, is disposed at a portion through which the clean section and the other volume chamber are communicated with each other, and a plurality of ring ribs are provided on the bottom portion of the element chamber around an outer peripheral portion of the funnel portion.

It may be further desired that the air-intake pipe passes through substantially a central portion of the other volume chamber, the other volume chamber is formed so as to provide a ring shape and have a length shorter than a length of the air-intake pipe in an axial direction thereof, and a breather hose is connected to the bottom portion of the another volume chamber so as to extend from another breather chamber formed in a crankcase of the engine unit.

The throttle body is disposed between the upper frames at a level substantially equal to the throttle body, which is provided with a throttle valve so as to open and close the air-intake passage in the throttle body so that a shaft of the throttle valve extends in the width direction of the vehicle, the shaft of the throttle valve being provided, at one end thereof, with a throttle pulley to be rotatable together with the shaft and disposed on one of lateral sides of the throttle body, and a fuel injector for spraying a fuel into the air-intake port is provided in the rear portion of the throttle body under the air cleaner, the fuel injector being tilted so as to direct toward the inside of the air-intake port.

In another aspect, there is also provided a straddle-type vehicle comprising:

a body frame including a pair of upper frames disposed substantially horizontally;

a pair of front wheels;

a pair of rear wheels;

a steering gear including a steering shaft;

an engine unit mounted between the front wheels and the rear wheels and below the upper frames and below upper portions of wheels, the engine unit including an engine body having a front portion overlapping with the front wheels, in a side view, and a cylinder assembly, the cylinder assembly having an upper end surface disposed at a portion opposing to and in proximity to the steering shaft and including a cylinder head provided with an air-intake port communicating with a combustion chamber, and the air-intake port being provided with a valve seat disposed to an opening of the combustion chamber; and an engine air-intake system including a throttle body connected to an upstream side of the air-intake port and an air cleaner connected to an upstream side of the throttle body via an air-intake pipe, the air-intake pipe extending from the throttle body linearly, substantially upward, along the steering shaft, and in a state connected to the air cleaner, a cylindrical clean section is formed in the air cleaner by a cleaner element on an extension of the air-intake pipe.

In this aspect, it may be desired that, in an arrangement in which the steering handle is positioned in a central position thereof, the engine intake system is arranged between the steering shaft and a perpendicular line passing an distal end portion of the steering handle.

In a straddle-type vehicle according to the present invention of the structures and characters mentioned above, the center of mass of the vehicle is lowered, and allocation of load to the front wheels is increased. Therefore, the steering performance of the vehicle can be improved. In addition, since the structure of the body frame, i.e., chassis frame, is simplified, the weight of the entire structure can be reduced and a manufacturing cost can be hence reduced. Moreover, since the temperature of the intake air is decreased and the air-intake resistance is also decreased, the air-intake efficiency can be improved. As a result, the engine power efficiency will be improved.

Furthermore, foreign matter is prevented from getting into the combustion chamber of the engine body, thus preventing the engine power from deteriorating. In addition, the entire structure and size of the engine air-intake system and the blow-by gas re-circulation system can be effectively reduced. The separation ability of the liquid from the blow-by gas can be also improved.

The nature and further characteristic features of the present invention will be made more clear from the following descriptions made with reference to the accompanying drawings.

DESCRIPTION OF THE PREFERRED EMBODIMENT

A preferred embodiment of the present invention will be described hereunder with reference to the accompanying drawings.

Figure 1:
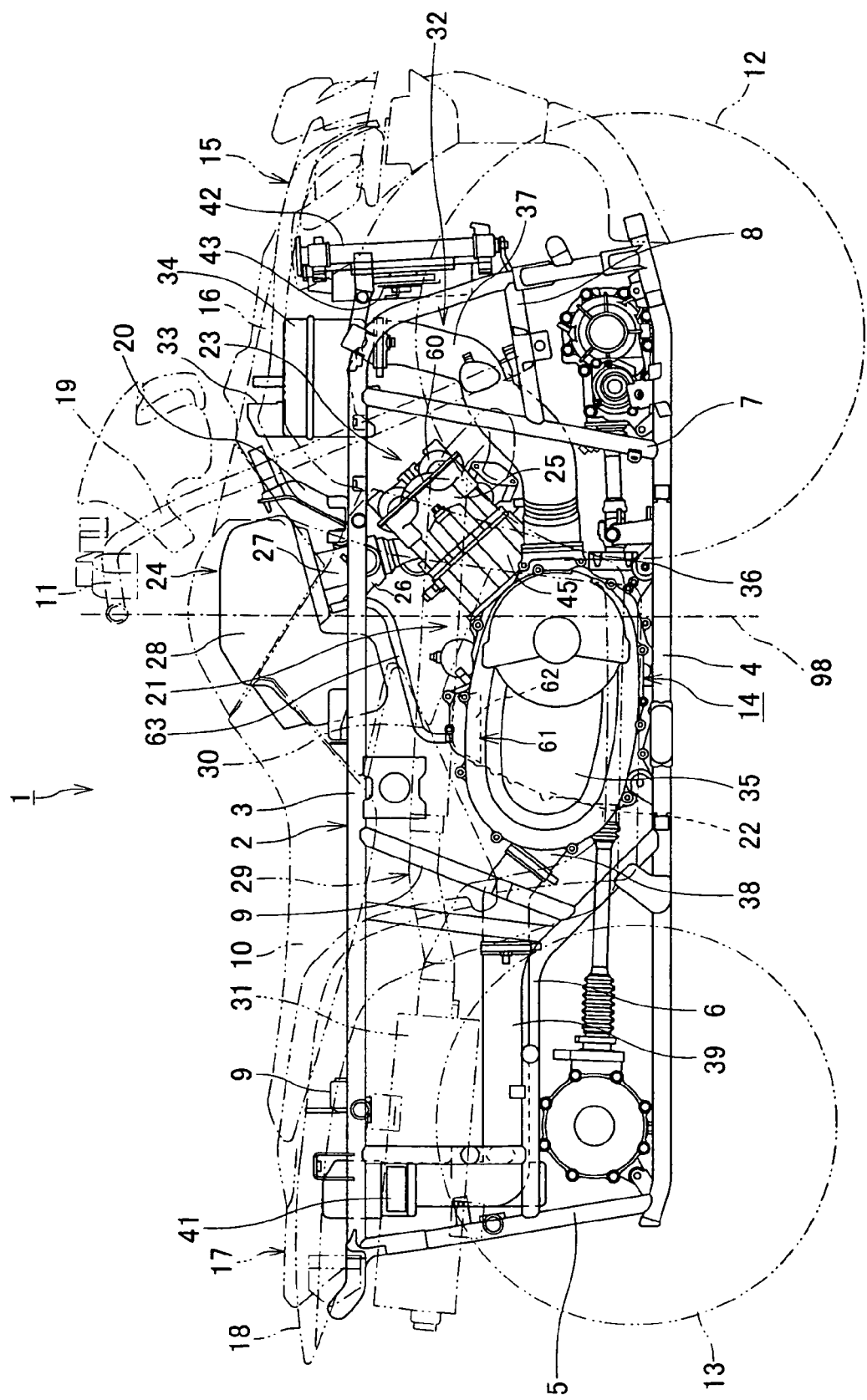
FIG. 1 is a right side view, partially cut away, showing a straddle-type vehicle having an improved air-intake system according to an embodiment of the present invention.
Figure 2:
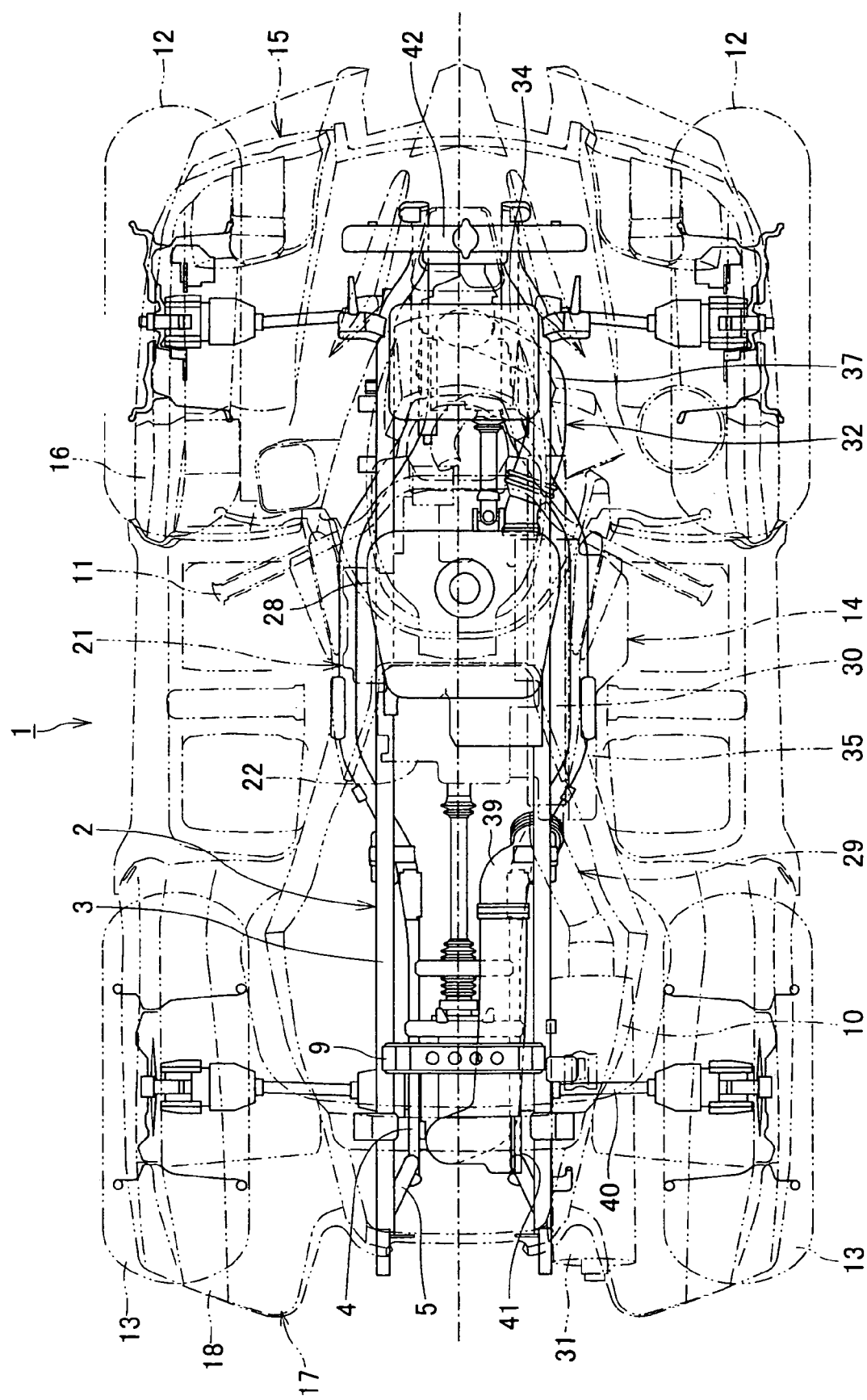
FIG. 2 is a top plan view showing the straddle-type vehicle of FIG. 1.

As shown in FIGS. 1 and 2, a straddle-type vehicle 1 includes a body frame (i.e., chassis or chassis frame) 2 formed of steel pipes. The chassis frame 2 has a cage shape and includes two (right and left) sets of frame parts. Each set includes an upper frame 3, a lower frame 4, a rear vertical frame 5, a rear longitudinal frame 6, a front vertical frame 7 and a front longitudinal frame 8. The rear vertical frame 5 connects the rear ends of the upper frame 3 and the lower frame 4. The rear longitudinal frame 6 connects the rear vertical frame 5 and the middle of the lower frame 4. The front vertical frame 7 is disposed in the front portion of the chassis frame 2 so as to connect the upper frame 3 and the lower frame 4. The front longitudinal frame 8 connects the front vertical frame 7 and the front portion of the upper frame 3. The chassis frame 2 further includes bridge members 9, through which one set of frame parts 3 to 8 are connected with the other set of frame parts 3 to 8, respectively.

A straddle-type seat 10 is provided over the rear portions of the upper frames 3, which constitute the chassis frame 2. A steering handle 11, constituting a steering gear of the vehicle 1, is provided in front of the seat 10. A pair of right and left front wheels 12 are provided in the front side of the chassis frame 2, and a pair of right and left rear wheels 13 are provided in the rear side of the chassis frame 2. Each of these front and rear wheels is connected to the chassis frame 2 via a suspension mechanism, not shown, and provided with a wide low-pressure tire. Each upper frame 3 is disposed substantially horizontally so as to connect the top portion of the front wheel 12 and the top of the rear wheel 13. The front end of each upper frame 3 is bent downward and joined to the front end of the corresponding lower frame 4.

An engine unit 14 is mounted between the front wheels 12 and the rear wheels 13, below the upper frames, and behind the steering handle 11. The engine unit 14 is disposed such that a substantial portion thereof is lower than the top portions of the wheels 12 and 13. A steering shaft 19, which also constitutes the steering gear, extends obliquely downward and forward from the base of the steering handle 11 toward the front wheels 12. The steering shaft 19 is supported rotatably by a support bracket 20, which is a supporting member extending upward from the upper frames 3.

The front portion of the chassis is provided with a front cover 15 and front fenders 16. The front cover 15 covers the upper front portion of the chassis frame 2, and the front fenders 16 cover the front wheels 12. The front fenders 16 are formed integrally with the front cover 15. The rear portion of the chassis frame 2 is provided with a rear cover 17 and rear fenders 18. The rear cover 17 covers the upper rear of the chassis frame 2, and the rear fenders 18 cover the rear wheels 13. The rear fenders 18 are formed integrally with the rear cover 17. These covers and fenders 15 to 18 are mold products of resin.

The engine unit 14 has a structure including an integrated combination of an engine main body 21 and a belt-type continuously variable transmission, not shown. The engine main body 21 is a water-cooled, four-stroke-cycle, single-cylinder engine. The engine main body 21 includes a crankcase 22 and a cylinder assembly 23. The cylinder assembly 23 is located in the upper front portion of the crankcase 22 and tilted forward at about a 45-degree angle.

The front portion of the engine main body 21 near the front end of the cylinder assembly 23 overlaps with the front wheels 12 when viewed from the side, i.e., in a side view. The upper end surface of the cylinder assembly 23 is disposed so as to closely oppose to the steering shaft 19.

An engine air-intake system 24 is disposed in a space surrounded by the upper part of the cylinder assembly 23, the front part of the seat 10 and the rear part of the steering shaft 19. The engine air-intake system 24 includes a throttle body 26 and an air cleaner 28. The throttle body 26 is connected to the upper rear of a cylinder head 25, which constitutes the cylinder assembly 23. The air cleaner 28 is disposed above the throttle body 26 and in front of the seat 10. The air cleaner 28 is connected to the upstream side of the throttle body 26 via an air-intake pipe 27. The air cleaner 28 is disposed partially above the upper frames 3.

An engine exhaust system 29 is disposed on one side of the engine main body 21, on the right side in the illustrated present embodiment. The engine exhaust system 29 includes an exhaust pipe 30 and an exhaust muffler 31 connected to the downstream end of the exhaust pipe 30, which is then connected to the front portion of the cylinder head 25. The exhaust pipe 30 further extends forward from the cylinder head 25 and is then bent rightward. The exhaust pipe 30 is further bent backward and extends on the right side of the engine unit 14, along the right upper frame 3 of the chassis frame 2, substantially horizontally. In the vicinity of the upper rear portion of the belt-type continuously variable transmission, the exhaust pipe 30 is displaced from the inside of the right upper frame 3 to the outside thereof.

The exhaust muffler 31 is disposed above the rear wheels 13 and below the rear cover 17.

The belt-type continuously variable transmission is provided with a transmission cooling system 32 disposed between the upper front portion of the chassis frame 2 and the front cover 15. The transmission cooling system 32 includes an induction box 34, a lead-in duct 37 and a lead-out duct 39. The induction box 34 is a resin mold product. A cooling-air intake port 33 is provided in the front top portion of the induction box 34 so as to be opened in proximity to the undersurface of the front cover 15. A belt case 35 is disposed on the right side of the engine main body 21, in which the continuously variable transmission is accommodated. An air-intake port 36 opens in the front portion of the belt case 35. An exhaust port 38 opens in the rear portion of the belt case 35. The lead-in duct 37 connects the air-intake port 36 and the induction box 34 so as to lead the cooling air into the belt case 35. The lead-out duct 39 is connected to the exhaust port 38, through which the air that cooled the belt continuously variable transmission flows out.

The lead-out duct 39 extends from the exhaust port 38 of the belt case 35 substantially horizontally backward. In the vicinity of and above the axle 40 of the right rear wheel 13, the lead-out duct 39 is bent upward, substantially vertically. In the vicinity of and directly under the rear end portion of the seat 10, the lead-out duct 39 is bent rightward. The lead-out duct 39 is then bent downward and extends substantially vertically. A cooling-air exhaust port 41 is opened at the downstream end of the lead-out duct 39.

A heat exchanger 42, including an oil cooler, a radiator and so on, of the engine main body 21 is placed in front of the steering shaft 19, in the vicinity of the most-front side of the chassis frame 2. A cooling fan 43 for the heat exchanger 42 is disposed behind the heat exchanger 42.

Figure 3:
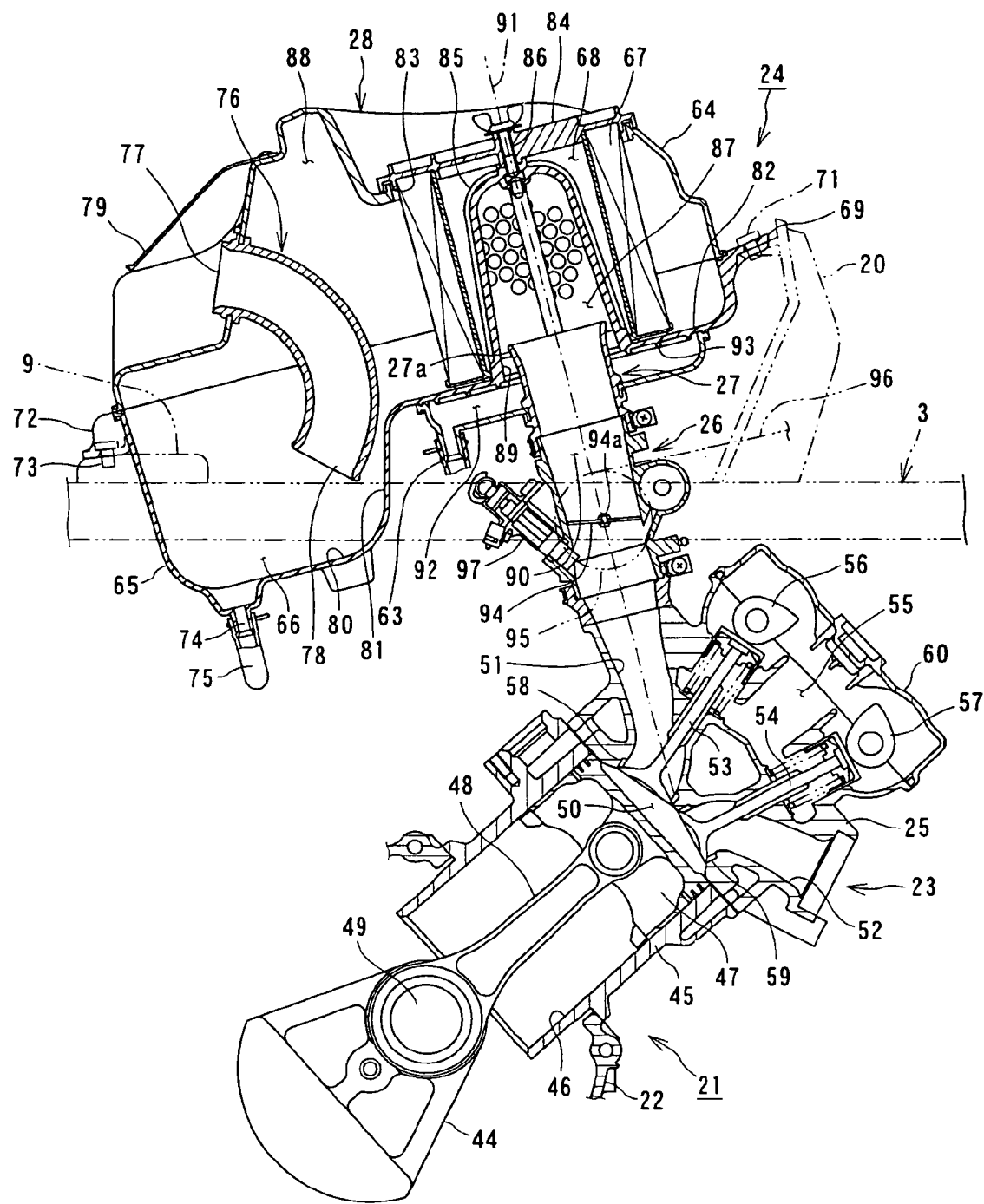
FIG. 3 is a longitudinal sectional view of the cylinder assembly and the engine air-intake system.

FIG. 3 is a longitudinal sectional view of the cylinder assembly 23 and the engine air-intake system 24. As shown in. FIG. 3, a crankshaft 44 is disposed in the crankcase 22 of the engine main body 21 so as to extend horizontally in the width direction of the vehicle 1. A cylinder 46 is formed in a cylinder block 45 constituting the cylinder assembly 23, and a piston 47 is provided slidably in the cylinder 46 to be reciprocal therein. The piston 47 is connected to a crankpin 49 of the crankshaft 44 via a con-rod 48. The reciprocating stroke of the piston 47 is transmitted to the crankshaft 44 via the con-rod 48 to rotate the crankshaft 44.

The cylinder head 25 is provided with a combustion chamber 50 fitted to the cylinder 46. A spark plug, not shown, is inserted into the combustion chamber 50. The cylinder head 25 is further provided with an air-intake port 51 and an exhaust port 52 which are communicated with the combustion chamber 50. The throttle body 26, constituting the engine air-intake system 24, is connected to the air-intake port 51, and the exhaust pipe 30, constituting the engine exhaust system 29, is connected to the exhaust port 52. An air-intake valve 53 and an exhaust valve 54 are disposed in the cylinder head 25. The air-intake valve 53 operates to open or close the air-intake port 51, and the exhaust valve 54 also acts to open or close the exhaust port 52. Two camshafts 56 and 57 are provided in a cam housing 55 of the cylinder head 25 so as to act to open or close the air-intake valve 53 and the exhaust valve 54, respectively. The air-intake port 51 and the exhaust port 52 are provided with valve seats 58 and 59, respectively, at their openings to the combustion chamber 50.

The engine main body 21 of the described embodiment is provided with a DOHC-type valve operating system in which one camshaft 56 handles the air-intake valve 53 and the other camshaft 57 handles the exhaust valve 54. The camshafts 56 and 57 are disposed in parallel to the crankshaft 44. The cam housing 55 of the cylinder head 25 is covered by a cylinder head cover 60.

Furthermore, as shown in FIG. 1, a breather 61 is provided in the uppermost portion of the crankcase 22. The breather 61 acts to separate an oil from the blow-by gas collected in the crankcase 22 and allow the pressure in the crankcase 22 to escape. The breather 61 includes a first breather chamber 62 having a labyrinthine structure. A breather hose 63 is connected to the upper surface of the first breather chamber 62, and the breather hose 63 allows the gas to flow back to the air cleaner 28.

Figure 4:
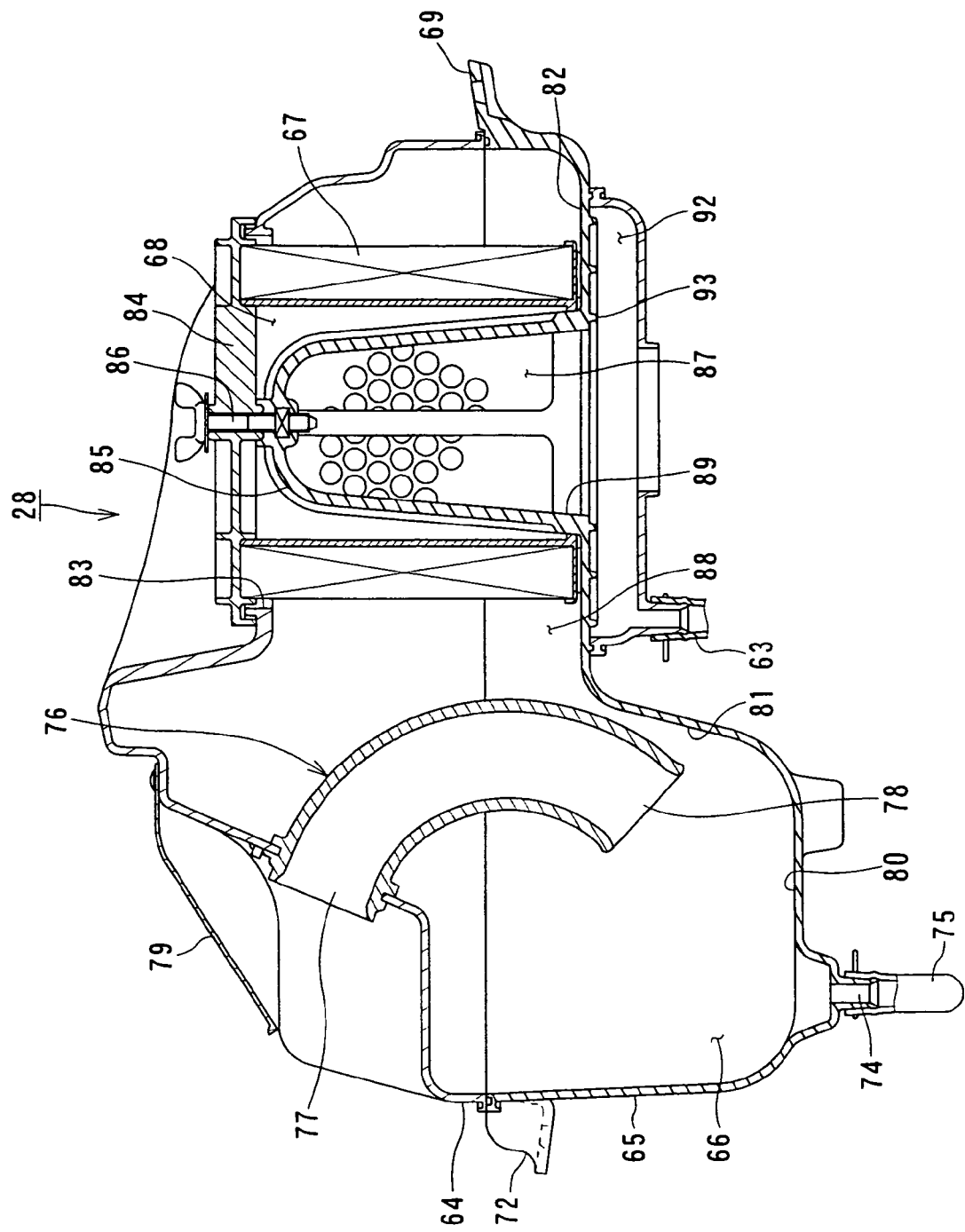
FIG. 4 is an enlarged longitudinal sectional view of an air cleaner of the engine of the vehicle.
Figure 5:
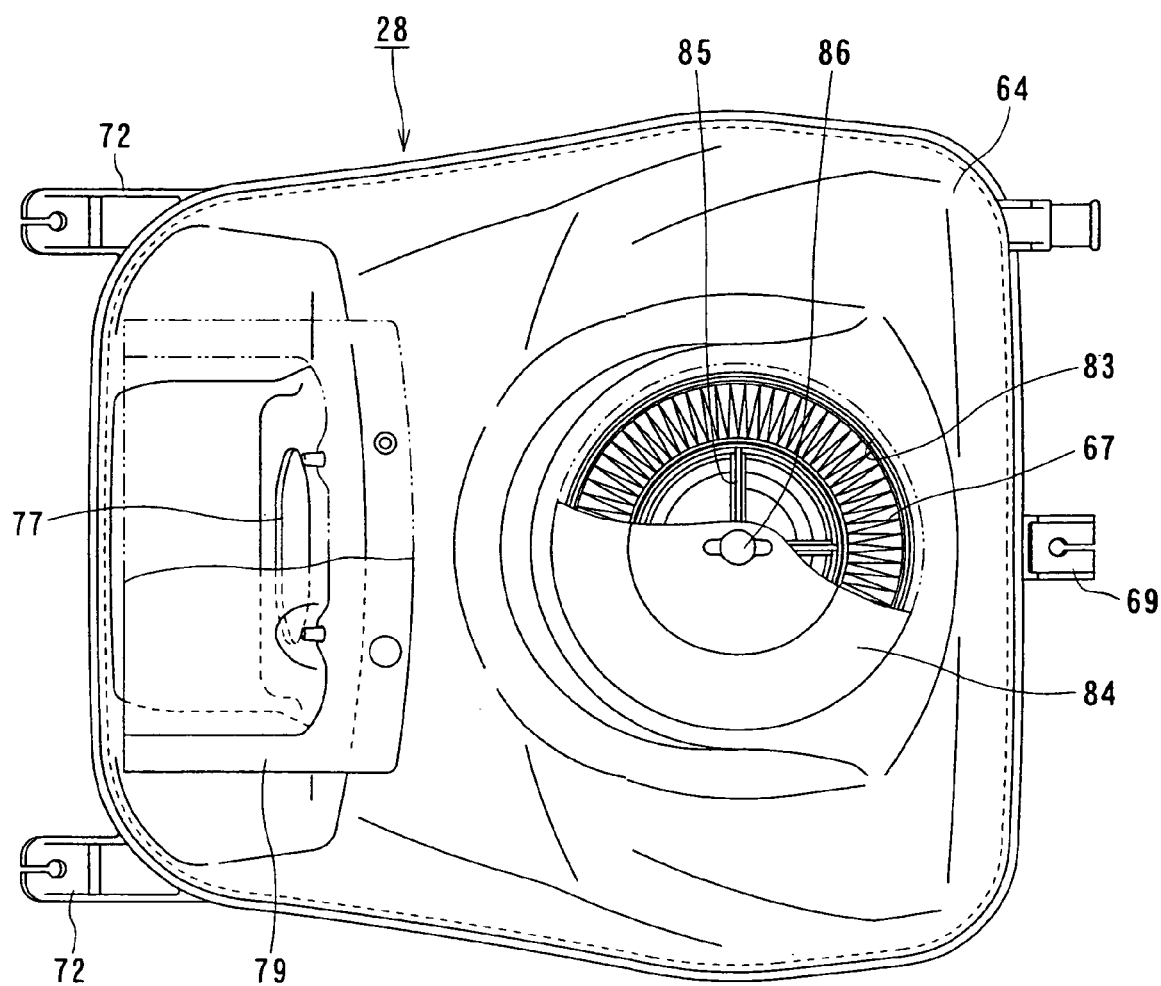
FIG. 5 is a top plan view of the air cleaner.
Figure 6:
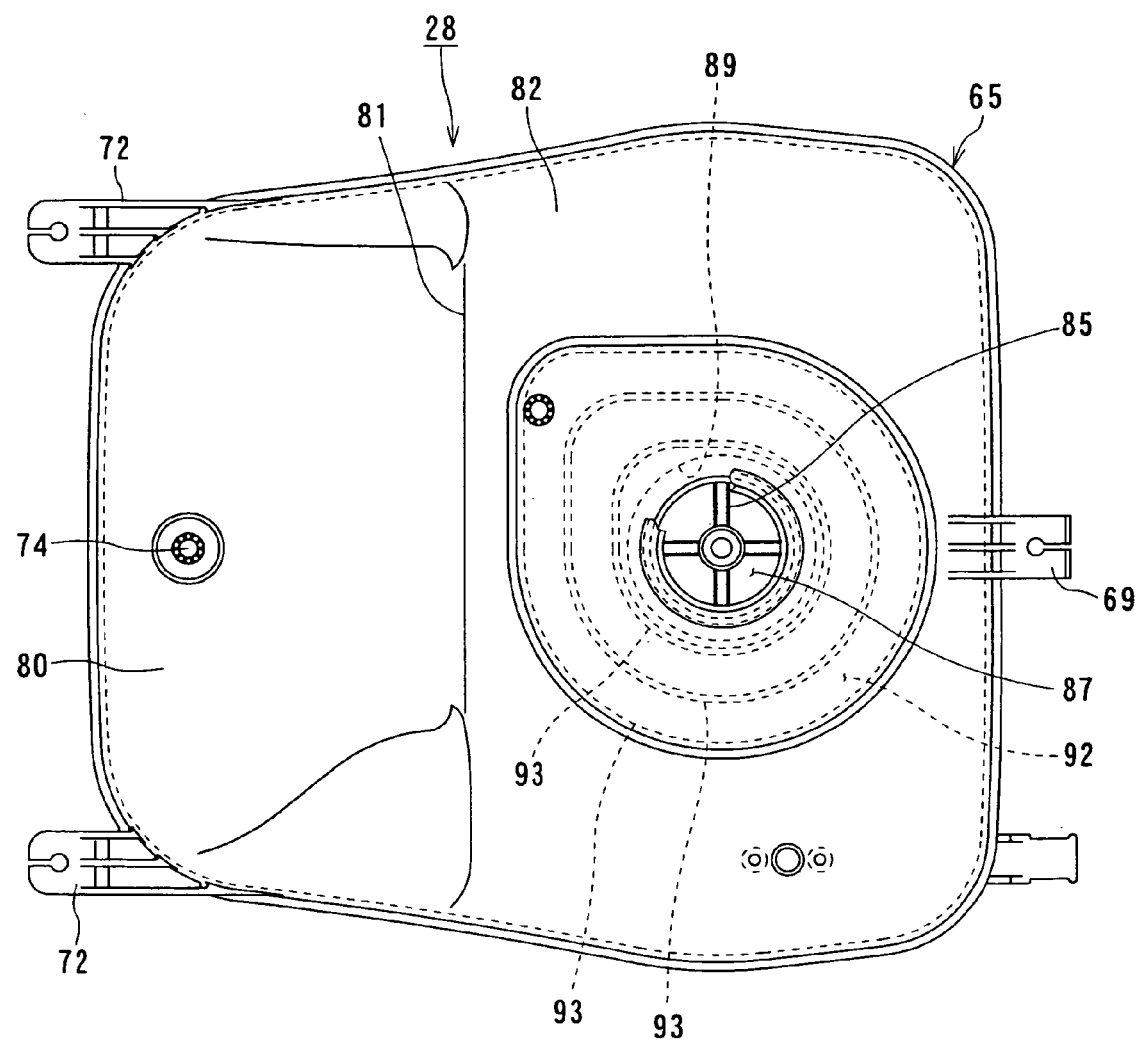
FIG. 6 is a bottom plan view of the air cleaner.

FIG. 4 is an enlarged longitudinal sectional view of the air cleaner 28, FIG. 5 is a top plan view of the air cleaner 28, and FIG. 6 is a bottom plan view of the air cleaner 28.

As shown in FIGS. 3 to 6, the air cleaner 28 includes an upper cleaner case 64 and a lower cleaner case 65 joined to each other. The air cleaner 28 further includes a volume chamber 66 inside the rear portion of the air cleaner 28 and an element chamber 68 inside the front portion thereof. The element chamber 68 has a space for accommodating a cleaner element 67 for filtering air. A front stay 69 is provided in the front portion of the air cleaner 28 and is fixed with a bolt 71 to the support bracket 20, which supports the steering shaft 19 rotatably. A pair of right and left rear stays 72 are provided in the rear portion of the air cleaner 28 and fixed with bolts 73 to the bridge member, 9 through which the right and left upper frames 3 are connected to each other, so that, when mounted, the air cleaner 28 is tilted backward.

Further, a drain hole 74 is formed to the rear bottom portion of the volume chamber 66, and a drain hose 75 is connected to the drain hole 74.

An inlet pipe 76 is provided in the rear portion of the air cleaner 28 and acts to take air into the air cleaner 28. The inlet opening 77 of the inlet pipe 76 is formed in the rear upper surface of the air cleaner 28 so as to face backward. The inlet pipe 76 extends obliquely backward and downward in the volume chamber 66. The inlet pipe 76 has an outlet opening 78 disposed so as to face the bottom portion 80 of the volume chamber 66. A shield 79 is provided above the inlet opening 77 of the inlet pipe 76 for blocking relatively large foreign matter from entering. A vertical wall 81 extends upward from the front end of the bottom portion 80 of the volume chamber 66. A bottom portion 82 of the element chamber 68 extends forward from the upper end of the vertical wall 81 in parallel with the bottom portion 80 of the volume chamber 66.

The cleaner element 67 is a known cylindrical one and is fitted in the element chamber 68 through an opening 83 at the top portion of the element chamber 68*m* and the opening 83 is closed by a lid 84 air-tightly.

The lid 84 is fixed to a supporter 85, which is formed integrally with the lower cleaner case 65, by means of bolt 86, thereby holding the cleaner element 67 in place. The space inside the air cleaner 28 is separated by the cleaner element 67 into inside and outside spaces. The cylindrical space inside the cleaner element 67 is a clean section 87, and the space outside the cleaner element 67 is a dirty section 88. The bottom portion 82 of the element chamber 68 is provided with an opening 89 opposing to the clean section 87. The upstream end of the air-intake pipe 27 is disposed in this opening 89. Further, a gap is provided between the inner edge of the opening 89 and the air-intake pipe 27.

The air-intake pipe 27 extends from the throttle body 26, substantially upward, along the steering shaft 19, and is connected to the air cleaner 28. The clean section 87 is aligned with the air-intake pipe 27. An air-intake path 90 connecting the air-intake port 51 of the cylinder head 25 and the air cleaner 28 is arranged so that an axis 91 connecting the clean section 87 and the throttle body 26 constitutes a straight line toward the valve seat 58 disposed at the opening of the combustion chamber 50 side of the air-intake port 51.

Furthermore, an opening 89 is formed in the bottom portion 82 of the element chamber 68. A second breather chamber 92, which is another volume chamber, is provided under the element chamber 68, around the air-intake path 90. The second breather chamber 92 is communicated with the clean section 87 through the opening 89. A breather hose 63 is connected to the bottom portion of the second breather chamber 92. The breather hose 63 extends from the first breather chamber 62. The clean section 87, the breather chamber 92, and the throttle body 26 are arranged in this order from the top side thereof.

The air-intake pipe 27 passes through substantially the central portion of the second breather chamber 92 as the other volume section. The second breather chamber 92 has a ring shape and has a length shorter than the air-intake pipe 27 in the axial direction of the air-intake pipe 27.

As shown in FIG. 3, a funnel portion 27*a* is provided at the upstream end of the air-intake pipe 27, extending inside the clean section 87 of the air cleaner 28 so as to be gradually widened outward in the diametrical direction. The funnel portion 27*a* is disposed at a portion at which the clean section 87 of the air cleaner 28 and the second breather chamber 92 are communicated with each other. A plurality of ring ribs 93 are provided concentrically on the outer bottom 82 of the element chamber 68 in the vicinity of and around the funnel portion 27*a*.

The throttle body 26 is disposed between a pair of lateral upper frames 3 arranged horizontally so as to connect the upper end portion of the front and rear wheels 12 and 13, at substantially the same level as that of the upper frames 3 in the side view. A throttle valve 94 is provided in the throttle body 26 so as to open or close the air-intake path 90 in the throttle body 26. The throttle valve 94 has a shaft 94*a* disposed in the width direction of the vehicle 1. A throttle pulley 95 is provided at one end of the shaft 94*a* to be rotatable together with the shaft 94*a* and disposed on the right or left side of the throttle body 26. Further, though not shown in detail, a throttle cable 96, wound around the throttle pulley 95, is connected to a throttle grip disposed to the end of the steering handle 11 and extends forward the air clearer 28.

A fuel injector 97 for spraying fuel into the air-intake port 51 is provided in the rear portion of the throttle body 26 under the air cleaner 28. The fuel injector 97 is tilted so as to face the inside of the air-intake port 51.

In addition, as shown in FIG. 1, in the arrangement of the steering handle 11 in its central position, the essential section of the engine intake system 24, including the intake port 51, the throttle body 26, the intake pipe 27 and the cleaner element 67, is arranged between the steering shaft 19 and the perpendicular line 98 passing the most end portion of the steering handle 11.

The embodiment of the present invention mentioned above will operate as follows.

In the illustrated and described embodiment, the front portion of the engine main body 21 (i.e., a portion in the vicinity of the front end of the cylinder assembly 23) overlaps with the front wheels 12 when viewed from the side (in a side view). The upper end surface of the cylinder assembly 23 is disposed at a portion opposing to and in proximity to the steering shaft 19. Therefore, the cylinder assembly 23 is located in the upper front portion of the crankcase 22 and tilted forward at about the 45-degree angle. Accordingly, the center of mass of the vehicle 1 is lowered, and allocation of load to the front wheels 12 is increased. As a result, the steering performance of the vehicle 1 can be improved. In addition, since the cylinder assembly 23 is tilted forward, the front portions of the upper frames 3 can be formed linearly. Therefore, the structure of the chassis frame 2 is simplified, thus achieving the weight reduction and cost reduction of the vehicle.

Moreover, since the cylinder assembly 23 is tilted forward, the air cleaner 28 can be disposed above the cylinder assembly 23 so as to project upward from the upper side of the substantially horizontal upper frames 3. In the described embodiment, the engine unit 14 is mounted below the upper frames 3, and the exhaust pipe 30 extends backward on the right side of the engine unit 14, substantially horizontally. Therefore, the intake air flowing through the engine air-intake system 24 is not heated by the radiation heat of the engine unit 14 and the exhaust pipe 30. As a result, the temperature of the intake air can be decreased, resulting in that the air-intake efficiency can be improved and the engine power can be increased.

In addition, since the cylinder assembly 23 is tilted forward, and the air cleaner 28 is disposed above the cylinder assembly 23, the air-intake path 90 connecting the intake port 51 of the cylinder head 25 and the air cleaner 28 can be linearly arranged so that the axis 91 connecting the clean section 87 and the throttle body 26 extends linearly toward the valve seat 58 disposed at the opening side of the combustion chamber 50 of the intake port 51. As a result, the air-intake resistance becomes small, and the throttle response and the air-intake efficiency can be improved, thus improving the engine power performance.

Furthermore, according to the present invention, the air cleaner 28 includes the volume chamber 66 inside the rear portion of the air cleaner 28 and the element chamber 68 inside the front portion of the air cleaner 28. The element chamber 68 contains the cleaner element 67 for filtering air. The inlet pipe 76 is provided in the rear of the air cleaner 28 so as to take air into the air cleaner 28. The inlet opening 77 of the inlet pipe 76 is disposed to the rear upper surface of the air cleaner 28 so as to face backward. The vertical wall 81 extends upward from the front end of the bottom portion 80 of the volume chamber 66. The bottom portion 82 of the element chamber 68 extends forward from the upper end of the vertical wall 81 so as to be in parallel with the bottom 80 of the volume chamber 66. Therefore, foreign matter such as water cannot get into the front side of the air cleaner 28. If a small amount of foreign matter gets into the rear side of the air cleaner 28, the foreign matter can be prevented by the vertical wall 81 from getting into the combustion chamber 50 of the engine main body 21. Consequently, the engine power can be prevented from deteriorating.

Still furthermore, according to the present invention, the support bracket 20 supports the steering shaft 19 rotatably. The supporting bracket 20 extends upward from the upper frames 3. The front portion of the air cleaner 28 is fixed to the support bracket 20, and the rear portion of the air cleaner 28 is fixed to the bridge member 9 of the chassis frame 2 so that the air cleaner 28 is tilted backward. The rear portion of the bottom 80 of the volume chamber 66 is formed with the drain hole 74. Therefore, if water gets into the air cleaner 28, the water is prevented from getting into the combustion chamber 50 of the engine main body 21 and can be easily drained.

Moreover, in the present invention, the engine air-intake system 24 further includes the second breather chamber 92 provided around the air-intake pipe 27. The clean section 87, the second breather chamber 92, and the throttle body 26 are arranged in this order in an overlapped manner. In addition, the air-intake pipe 27 passes through the middle of the second breather chamber 92. The ring-shaped second breather chamber 92 has a length shorter than that of the air-intake pipe 27 in the length direction of the air-intake pipe 27. The breather hose 63 is connected to the bottom of the second breather chamber 92 so as to extend from the first breather chamber 62 provided in the crankcase 22 of the engine unit 14. Therefore, the entire structure or size of the engine air-intake system 24 and the blow-by gas reflux system can be reduced in compact. In addition, the ability to separate liquid from the blow-by gas can be also improved. Furthermore, since the air cleaner 28 is disposed above the crankcase 22, the breather hose 63 can be arranged with a head difference between both ends thereof. Therefore, the separation of the liquid from the blow-by gas can be effectively performed.

Still furthermore, according to the present invention, the opening 89 is provided in the bottom 82 of the element chamber 68. The second breather chamber 92, which is another volume chamber, is provided under the element chamber 68. The second breather chamber 92 is communicated with the clean section 87 through the opening 89. The gradually widened funnel portion 27a is provided at the upstream end of the air-intake pipe 27. The funnel portion 27a is disposed in the opening 89 so as to extend into the clean section 87. The plurality of ring ribs 93 are provided on the outer bottom portion 82 of the element chamber 68 in the vicinity of and around the funnel portion 27a. Therefore, the entire structure of the engine air-intake system 24 can be reduced in compact, the air-intake noise is prevented, and the air-intake efficiency can be hence improved. In addition, the separation of the liquid from the blow-by gas can be also performed more effectively.

Still furthermore, according to the present invention, the throttle body 26 is disposed between the upper frames 3, substantially at the same level as that of the upper frames 3. The throttle valve 94 is provided in the throttle body 26 so as to open or close the air-intake path 90 in the throttle body 26, and the throttle body 94 has the shaft 94a extending in the width direction of the vehicle 1. The throttle pulley 95 is provided at one end of the shaft 94a to be rotatable together with the shaft 94a and disposed on the right or left side of the throttle body 26. The fuel injector 97 for spraying the fuel into the air-intake port 51 is provided in the rear portion of the throttle body 26 under the air cleaner 28. The fuel injector 97 is tilted so as to face the inside of the air-intake port 51. Therefore, the throttle cable 96 and the fuel injector 97 can be easily fitted to the vehicle 1, thus improving the maintainability and maneuverability. The throttle cable 96 wound on the throttle pulley 95 is relatively short, thus improving the compact arrangement of the throttle cable 96. In addition, friction loss of the throttle cable 96 is reduced. Further, since one upper frame 3 is disposed beside the throttle body 26, the fuel injector 97 and the throttle pulley 95, these components can be protected from lateral impact.

Still furthermore, in the arrangement of the steering handle 11 in its central position, the essential section of the engine intake system 24, including the intake port 51, the throttle body 26, the intake pipe 27 and the cleaner element 67, is arranged between the steering shaft 19 and the perpendicular line 98 passing the most end portion of the steering handle 11. Accordingly, the rear side position of the engine intake system can be determined, and as a result of this arrangement, the position of the engine unit can be also determined, load distribution on the front wheels increases, and the maneuverability of the vehicle can be thereby improved.

The present invention is not limited to the specific embodiment mentioned above and many other changes and modifications may be made without departing from the scopes of the appended claims.

What is claimed is:

1. A straddle-type vehicle comprising:
a body frame including a pair of upper frames disposed substantially horizontally;
a pair of front wheels;
a pair of rear wheels;
a steering gear including a steering shaft; an engine unit mounted between the front wheels and the rear wheels and below the upper frames and substantially below upper portions of the wheels, said engine unit including an engine body having a front portion overlapping with the front wheels in a side view, and a cylinder assembly, said cylinder assembly having an upper end surface disposed at a portion opposing to and in proximity to the steering shaft, the cylinder assembly including a cylinder head provided with an air-intake port communicating with a combustion chamber, the air-intake port being provided with a valve seat disposed to an opening of the combustion chamber; and
an engine air-intake system including a throttle body connected to an upstream side of the air-intake port and an air cleaner connected to an upstream side of the throttle body via an air-intake pipe, said air-intake pipe extending from the throttle body linearly, substantially upward, along the steering shaft, and in a state connected to the air cleaner, a cylindrical clean section is formed in the air cleaner by a cleaner element on an extension of the air-intake pipe.

2. The straddle-type vehicle according to claim 1, wherein, in an arrangement in which the steering handle is positioned in a central position thereof, the engine intake system is arranged between the steering shaft and a perpendicular line passing a distal end portion of the steering handle.

3. A straddle-type vehicle comprising:
a body frame including a pair of upper frames disposed substantially horizontally;
a pair of front wheels;
a pair of rear wheels;
an engine unit mounted at a portion between the front wheels and the rear wheels, below the upper frames and substantially below upper portions of the wheels, said engine unit including a cylinder head provided with an air-intake port communicating with a combustion chamber, said air-intake port being provided with a valve seat disposed to an opening of the combustion chamber; and
an engine air-intake system including a throttle body connected to an upstream side of the air-intake port and an air cleaner connected to an upstream side of the throttle body via an air-intake pipe, the air cleaner having an inner clean section,
wherein the air cleaner projects upward over the upper frames and an air-intake path of the throttle body extends substantially linearly along an axis connecting the clean section and the throttle body that extends linearly toward the valve seat.

4. The straddle-type vehicle according to claim 3, wherein said air cleaner is provided with a volume chamber at an inner rear portion of the air cleaner and an element chamber at an inner front portion thereof in which a cleaner element for filtering air is arranged, an inlet pipe is provided in the volume chamber of the air cleaner and adapted to take air into the volume chamber, the inlet pipe has an inlet opening disposed in a rear upper surface of the air cleaner so as to face backward, the volume chamber is provided with a vertical wall extending upward from a front end of a bottom portion of the volume chamber, and element chamber has a bottom portion which extends forward from an upper end of the vertical wall to be in parallel with the bottom portion of the volume chamber.

5. The straddle-type vehicle according to claim 4, further comprising a steering gear including a steering shaft and a supporting member supporting the steering shaft rotatably so as to extend upward from the upper frames, wherein the front portion of the air cleaner is fixed to the supporting member and the rear portion thereof is fixed to the body frame so that the air cleaner is tilted backward.

6. The straddle-type vehicle according to claim 5, wherein a drain hole is formed to a rear portion of the bottom portion of the volume chamber.

7. The straddle-type vehicle according to claim 4, wherein another volume chamber is provided under the bottom portion of the element chamber so as to be communicated with the clean section through an opening formed to the bottom portion of the another volume chamber, a funnel portion, which is widened in a diameter direction thereof at an upstream side end portion of the intake pipe extending in the clean section of the air cleaner, is disposed at a portion through which the clean section and the another volume chamber are communicated with each other, and a plurality of ring ribs are provided on the bottom portion of the element chamber around an outer peripheral portion of the funnel portion.

8. The straddle-type vehicle according to claim 7, wherein said air-intake pipe passes through substantially a central portion of the another volume chamber, the another volume chamber is formed so as to provide a ring shape and have a length shorter than a length of the air-intake pipe in an axial direction thereof, and a breather hose is connected to the bottom portion of the another volume chamber so as to extend from another breather chamber formed in a crankcase of the engine unit.

9. The straddle-type vehicle according to claim 3, wherein said engine air-intake system further includes a breather chamber provided around the air-intake pipe, and the clean section, the breather chamber and the throttle body of the engine air-intake system are arranged in an overlapped fashion in the described order from an upper side thereof in an installed state of the engine.

10. The straddle-type vehicle according to claim 3, wherein said throttle body is disposed between the upper frames at a level substantially equal to a level of the upper frames, said throttle body is provided with a throttle valve so as to open and close an air-intake path in the throttle body so that the throttle valve has a shaft disposed in the width direction of the vehicle, the shaft of the throttle valve being provided, at one end thereof, with a throttle pulley to be rotatable together with the shaft and disposed on one of lateral sides of the throttle body, and a fuel injector for spraying a fuel into the air-intake port is provided in the rear portion of the throttle body under the air cleaner, the fuel injector being tilted so as to direct toward the inside of the air-intake port.

11. A straddle-type vehicle comprising:
a body frame including a pair of upper frames disposed substantially horizontally;
a pair of front wheels;
a pair of rear wheels;
an engine unit mounted at a portion between the front wheels and the rear wheels and below the upper frames, said engine unit including a cylinder head provided with an air-intake port communicating with a combustion chamber, said air-intake port being provided with a valve seat disposed to an opening of the combustion chamber; and
an engine air-intake system including a throttle body connected to an upstream side of the air-intake port and an air cleaner connected to an upstream side of the throttle body via an air-intake pipe, and a fuel injector for spraying a fuel into the air intake port,
wherein the air cleaner is provided with an inner clean section disposed above the upper frames and wherein an air-intake path of the throttle body extends substantially linearly toward the valve seat.

12. The straddle-type vehicle according to claim 11, wherein the fuel injector is disposed at a rear portion of the throttle body under the air cleaner, the fuel injector being tilted so as to direct toward an inside of the air-intake port at an upstream side of the valve seat.

* * * * *